United States Patent
Liu et al.

(10) Patent No.: US 11,240,370 B1
(45) Date of Patent: Feb. 1, 2022

(54) MODELING AND ANALYSIS OF CALLS IN IPBX

(71) Applicant: 8x8, Inc., San Jose, CA (US)

(72) Inventors: Zhishen Liu, San Jose, CA (US); Qing Zhao, San Jose, CA (US); Bryan R. Martin, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 430 days.

(21) Appl. No.: 14/725,878

(22) Filed: May 29, 2015

(51) Int. Cl.
*H04M 3/22* (2006.01)
*H04M 7/00* (2006.01)

(52) U.S. Cl.
CPC ......... *H04M 3/2218* (2013.01); *H04M 7/006* (2013.01)

(58) Field of Classification Search
None
See application file for complete search history.

(56) References Cited

U.S. PATENT DOCUMENTS

| | | | |
|---|---|---|---|
| 6,252,947 B1 * | 6/2001 | Diamond | G11B 31/00 379/88.09 |
| 6,731,730 B1 * | 5/2004 | Zolotov | H04M 15/00 379/121.05 |
| 6,772,107 B1 * | 8/2004 | La Cascia, Jr. | G06F 11/3414 703/21 |
| 6,782,080 B2 | 8/2004 | Leivo et al. | |
| 7,212,516 B1 * | 5/2007 | O'Sullivan | H04M 3/5237 370/352 |
| 7,647,041 B2 | 1/2010 | Gonsalves et al. | |
| 8,218,736 B1 * | 7/2012 | McClintock | H04M 1/642 379/88.12 |
| 8,300,634 B2 | 10/2012 | Narayanaswamy | |
| 2007/0071206 A1 * | 3/2007 | Gainsboro | G10L 25/63 379/168 |
| 2007/0248022 A1 * | 10/2007 | Kumar | H04L 43/16 370/252 |

(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).

(Continued)

*Primary Examiner* — Jeffrey M Rutkowski
*Assistant Examiner* — Mehedi S Aley
(74) *Attorney, Agent, or Firm* — Crawford Maunu PLLC

(57) ABSTRACT

Apparatuses and methods concerning routing of calls in an IPBX server are disclosed. As an example, one apparatus includes an IPBX server configured to route VoIP calls for a plurality of end-users having respective VoIP-enabled circuit devices communicatively coupled to the IPBX server via a communications network. A call data processing circuit is communicatively coupled to the IPBX server. The call data processing circuit is configured to receive call event messages corresponding to a plurality of end-users from the IPBX server and generate call models from the call event messages. The call data processing circuit also generates call summary metrics from the call models. In response to an input query, the call data processing circuit evaluates the call summary metrics for a parameter of interest specified in the input query to generate data for the parameter of interest.

27 Claims, 8 Drawing Sheets

(56) References Cited

U.S. PATENT DOCUMENTS

| | | | |
|---|---|---|---|
| 2008/0118041 A1 | 5/2008 | Finogenov | |
| 2009/0028161 A1* | 1/2009 | Fullarton | H04L 47/805 370/395.41 |
| 2009/0221265 A1 | 9/2009 | Liu et al. | |
| 2009/0285381 A1* | 11/2009 | Phelps | H04M 3/54 379/211.02 |
| 2010/0197288 A1 | 8/2010 | Camilleri et al. | |
| 2011/0299673 A1* | 12/2011 | Mello | H04M 15/50 379/114.01 |
| 2012/0155455 A1* | 6/2012 | Russell | H04L 12/66 370/352 |

OTHER PUBLICATIONS

Jeff Goldman, "TalkPlus: a PBX for Mobil Phones," www.voipplanet.com (Aug. 16, 2007).

\* cited by examiner

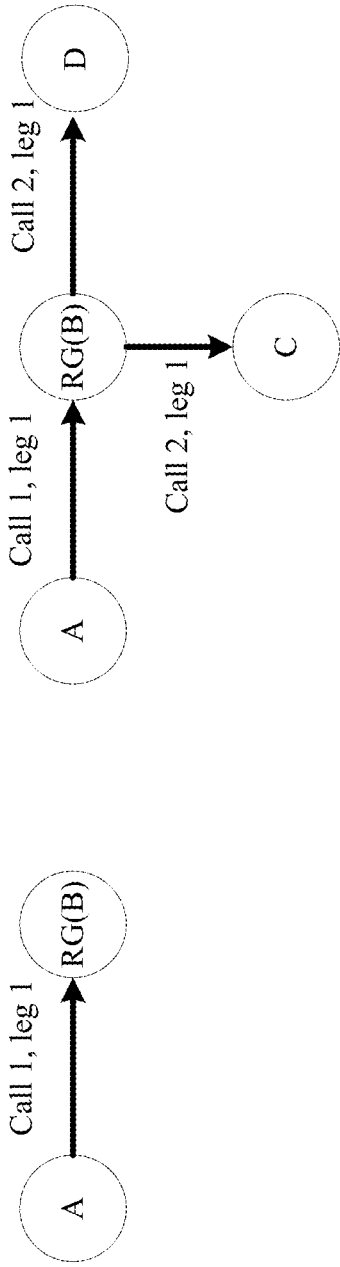
FIG. 6-1
FIG. 6-2
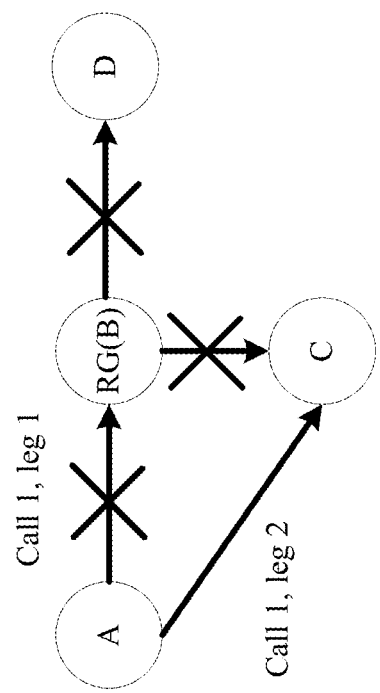
FIG. 6-3

US 11,240,370 B1

MODELING AND ANALYSIS OF CALLS IN IPBX

OVERVIEW

A private branch exchange (PBX) routes calls between a service provider network (e.g., a cellular network or a public standard telephone network (PSTN) and a plurality of end-users having respective telephone extensions in a private telecommunication network. One type of PBX, known as an Internet Protocol PBX (IPBX), routes calls between a service provider network and a plurality of Voice over Internet Protocol (VoIP)-enabled circuit devices on an IP network using VoIP, in which each device is assigned a respective telephone extension.

SUMMARY

Apparatuses and methods concerning routing of calls in an IPBX are disclosed. In an example, one apparatus includes an IPBX server configured to route VoIP calls for a plurality of end-users having respective VoIP-enabled circuit devices communicatively coupled to the IPBX via a communications network. A call data processing circuit is communicatively coupled to the IPBX server. The call data processing circuit is configured to receive call event messages corresponding to a plurality of end-users from the IPBX and generate call models from the call event messages. The call data processing circuit also generates call summary metrics from the call models. In response to an input query, the call data processing circuit evaluates the call summary metrics for a parameter of interest specified in the input query to generate data for the parameter of interest.

A method is also disclosed. Using an IPBX server, VoIP calls are routed for a plurality of end-users having respective VoIP-enabled circuit devices communicatively coupled to the IPBX server via a communications network. Call event messages, indicating changes in statuses of the routed VoIP calls, are provided to a call data processing circuit communicatively coupled to the IPBX server. Using the call data processing circuit, call models are generated from the call event messages and call summary metrics are generated from the call models. The call summary metrics may be generated after the call has completed and the call model is completed or may be generated and updated in real time during the call as the call model is being created and updated. In response to an input query, the call summary metrics are evaluated for a parameter of interest specified in the input query to generate data for the parameter of interest.

BRIEF DESCRIPTION OF THE FIGURES

The disclosure may be more completely understood in consideration of the following detailed description of various embodiments of the disclosure, in connection with the accompanying drawings in which:

FIG. 5-1 through 5-5 illustrate an example call between multiple call participants;

FIG. 6-1 through 6-3 illustrate another example call between multiple call participants;

Figure 1:
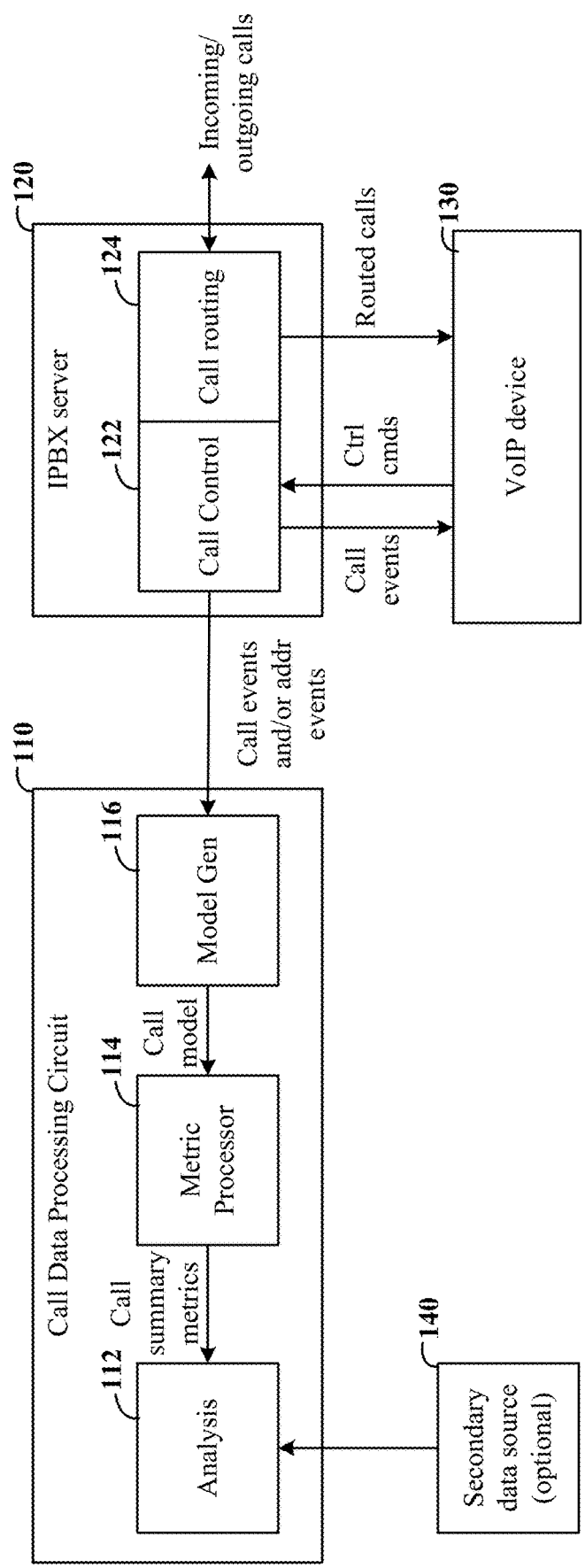
FIG. 1 shows a first example communication system having an IPBX and call data processing circuit configured in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DESCRIPTION

Aspects of the present disclosure are believed to be applicable to a variety of different types of apparatuses, systems and methods utilizing an IPBX server to provide communication services for a plurality of end-users in a network. In some implementations, an IPBX server is configured to perform various call related actions (e.g., create call, fork call, answer, hang-up, transfer, place on hold, and/or merge calls) in response to receiving a call control command from a VoIP device or user interface of an end-user. The IPBX server also generates call event messages to indicate changes in status of calls to call participants. Call event messages may include for example, offered, ringing/alerting, connected, disconnected, on-hold, parked, reconnected, call transferred, and/or calls merged/conferenced. The call event messages may be provided to various end-users and/or applications in addition to end-users who are participants in a call. For example, a switchboard application may be configured to display status of calls on the network to receptionists to allow call receptionists to better direct calls. While the disclosed embodiments are not necessarily limited to such applications, various aspects of the present disclosure may be appreciated through a discussion of various examples using this context.

In one or more embodiments, an apparatus includes a call data processing circuit communicatively coupled to an IPBX server. The call data processing circuit is configured to receive call event messages corresponding to calls to or from the end-users by the IPBX server. The call data processing circuit is configured to generate call models from the call event messages. A call model includes data indicative of call participants and/or events of a respective call routed by the IPBX server. As explained in more detail with reference to the figures, various telecommunications links may be established between end-user participants in the duration of a call as the call is transferred, parked, forwarded, or merged another call in a conference, for example. For ease of reference, a telecommunications link may be referred to as a link.

In some embodiments, a call model includes a respective record for each link between end-users involved in the duration of a call. The record may indicate, for example, end-users or devices served by the link, call events corresponding to the link, times of the call events, performance of the link (e.g., throughput, packet loss, and/or latency), or various combinations thereof.

The call data processing circuit generates call summary metrics from the call models. Call summary metrics may indicate various statistics characterizing the call such as total call time, caller on hold time, ring time, number of transfers, number of call participants, etc. Additionally or alternatively, call summary metrics may indicate various statistics indicative of participation of end-users in the call. Statistics indicative of participation of end-users may include, for example, time the end-user was on the call, time the end-user had the call on hold, time for the end-user to answer the call, whether or not the end-user transferred the call, whether the call was abandoned, and/or performance outcome (e.g., sales results or customer survey ratings).

In some embodiments, the call data processing circuit is configured to use call summary metrics for individual calls to generate cumulative call summary metrics, which aggregate call metrics for a plurality of calls. Cumulative call summary metrics may be determined for individual end-users or for all calls routed by the IPBX server. Cumulative call summary metrics may include for example a number of incoming calls, a number of outgoing calls, a number of answered calls, a number of missed calls, a number of abandoned calls, average call time, average time to answer, and/or average on-hold time. In various implementations, cumulative call summary metrics may aggregate call summary metrics for calls occurring over various time periods including, for example, minutes, hours, days, weeks, months, or years. In some implementations, cumulative call summary metrics may be updated in real time as new call summary metrics are generated.

In some embodiments, the call data processing circuit is configured to perform an analysis of the call summary metrics. For instance, the call data processing circuit may evaluate the generated call summary metrics for a parameter of interest specified in an input query. The input query may request the call data processing circuit to analyze the call summary metrics for various parameters of interest. Parameters of interest may include, for example, identifiers for specific ones of the call summary metrics, criteria for identifying subsets of the call summary metrics, and/or values derived from a function of the call summary metrics.

As an illustrative example, an input query may request the call data processing circuit to filter call summary metrics to produce a subset of the call summary metrics indicative of a parameter of interest specified in the input query. Data for the parameter of interest may then be generated based on the subset of the call summary metrics. As another example, the input query may request the data processing circuit to determine ones of the call summary metrics having a strong correlation with a parameter of interest specified in the input query. As another example parameter of interest, the input query may request to identify a set of values of the call summary metrics, which have a strong correlation to a set of calls specified by the input query. After identifying the set of values, the values may be used as a signature to identify similar calls as they occur. This process may be useful, for example, to determine a signature to detect fraudulent calls based on calls previously identified as being fraudulent. Similarly, the input query may specify call summary metrics and/or analytics for customers leading up to new sales contracts. As yet another example parameter of interest, the input query may request to identify call summary metrics that are exhibiting a recent trend in comparison to a historical average value. Trends may be identified, for instance, based on deviation of metric values in a recent time window from an average calculated from the previous time window. In some implementations, the analysis process may further evaluate identified trends to identify other metrics that exhibit a strong correlation with the identified trend. In some embodiments, the call data processing circuit is configured to correlate call summary metrics with data provided from other sources to facilitate further analysis. Other data sources may include, for example, applications utilized by the end-users in the network, internet-connected data repositories, and/or third-party data subscription services. As one example, a presence (or activity) detection circuit may provide data indicating statuses of the end-users to the call data processing circuit. The status data may be communicated to the call data processing circuit using, for example, the Extensible Messaging and Presence Protocol (XMPP). Status of an end-user may be determined based on activity data such as input commands/requests, in network applications (such as a virtual office environment), that are indicative that a user is active on the network. Some examples of activities can include a user checking/sending email by an end-user, use of scheduling application by an end-user, use of a video conferencing application by an end-user, retrieving files from a file server by the end-user, and an active virtual desktop session of the end-user.

Status of end-users may provide insight for analyzing call summary metrics. For instance, numbers of missed (unanswered) calls may be indicative of performance of end-users. However, user status data may indicate that some or all calls were missed because the end-user was away from their desk or participating in a higher-priority activity. Cross correlation of call summery metrics with user statuses may assist in filtering out call metrics for calls that may not be relevant to a particular inquiry. For further information regarding presence detection circuits and methods, reference may be made to U.S. application Ser. No. 14/661,902, entitled "IPBX CONTROL INTERFACE FOR DISTRIBUTED NETWORKS", which is fully incorporated by reference herein.

An input query may prompt the call data processing circuit to perform a one-time process or to perform a continuous or a periodic process. For instance, an input query may request the call data processing circuit to provide call summary metrics to a graphical user interface (GUI) configured to display statuses of calls in an IPBX. The input query may request the GUI in real time as the call summary metrics are updated.

For ease of explanation, the examples are primarily described with reference to an IPBX server. However, the embodiments are not so limited. Rather, some disclosed aspects may be applicable to methods, systems, and apparatuses that provide various types of communication channels including for example, voice calls, voicemail, short-message-service (SMS) messaging, instant messaging, memos, and/or email.

Turning now to the figures, FIG. 1 shows an example communication system having an IPBX server configured in accordance with one or more embodiments. The IPBX server 120 includes a call routing circuit 124 configured to route VoIP calls for VoIP-enabled devices (e.g., 130) communicatively coupled to the IPBX server 120 via a network. Each of the VoIP enabled devices corresponds to a respective end-user or call receptionist in the IPBX.

The IPBX server 120 includes a call control circuit 122 configured to direct routing of calls by the call routing circuit 124, responsive to the VoIP-enabled devices 130. VoIP-enabled devices 130 communicates call control commands to the call control circuit 122 of the IPBX server 120 to prompt the call routing circuit 124 to perform various call-related actions selected by an end-user or receptionist. The call control circuit 122 provides event messages to the switchboard interface to indicate changes in statuses of the pending calls to VoIP-enabled devices 130 of end-users who are active participants in the call.

As previously indicated, call event messages may be provided to various end-users and/or applications in addition to end-users who are participants in a call. For instance, in some implementations, an authorized user or application may initiate a subscription to monitor call events for specified end-users. In response to receiving a subscription request, the call control circuit 122 initiates a new subscription for the switchboard interface. While the subscription is active, the call control circuit 122 provides event messages to the subscriber to indicate changes in statuses of the calls for the end-users specified in the subscription.

A call data processing circuit 110 is configured to receive the call event messages generated by the IPBX server 120 for calls to or from the end-users. The call data processing circuit 110 includes a model generation circuit 116 configured to generate call models from the call event messages. As previously described, the call model may include records describing telecommunication links, participants, and/or events of each call. The call data processing circuit also includes a metric processor circuit 114 configured to generate call summary metrics from the call models. As previously described, the call summary metrics may indicate various statistics characterizing each call and/or end-user participation in the call.

In some embodiments, the call data processing circuit 110 may generate additional sets of data metrics based on data provided from one or more secondary data sources 140. Secondary data sources may include, for example, devices connected in the network, applications utilized by the end-users in the network, internet-connected data repositories and devices, and/or third-party data subscription services. For example, the analysis circuit may be configured to generate data metrics based on address events indicating statuses of extensions, call queues, or agent groups in the IPBX. Address events may include, for example, META_SNAPSHOT, IN_SERVICE, OUT_OF_SERVICE, CREATED, REMOVED, LINKED, UNLINKED, DND, IDLE, ON_CALL, WrapUP, QUEUE_LOGIN, and/or QUEUE_LOGOUT. Based on the address events, the call data processing circuit 110 may generate various metrics including, for example, time in service, time out of service, or number of queues serviced by an agent extension, or call queue agent state transition information. As another example, the call data processing circuit 110 may generate data metrics based on SIP registration events, which report statuses of end-user VoIP devices. Status of user devices may include, for example, time registered, time unregisters, time until expiration of registration, bandwidth of telecommunication links between end-users. Additionally or alternatively, the call data processing circuit 110 may generate data metrics relating to end user status based on presence detection events (e.g., XMPP presence events) indicative of user end-user activity and/or status in a network. Data metrics related to network performance (e.g., packet loss or throughput) may also be generated based on data received from a network monitor. As another example, data metrics related to sales may be generated based on data received from a telemarketing system.

The call data processing circuit 110 may utilize various processes to generate data metrics for received data. In some embodiments, the call data processing circuit 110 may implement a processing engine via an event bus (e.g., KAFKA) to consume various types of events (e.g., call events, address events, and/or status events) and generate data metrics. For example, the call data processing circuit 110 may implement respective KAFKA event stream processes to consume and process different types of events.

In this example, the call data processing circuit 110 includes an analysis circuit 112 configured to analyze the generated call summary metric. As previously described, in some embodiments the analysis circuit 112 is configured to evaluate the generated call summary metrics for an input query to generate various analytical data sets. In some implementations, the analysis circuit 112 is configured to cross correlate the call summary metrics with various other data metrics generated from data received from secondary sources. Data generated by the analysis circuit 112 may be used by various network applications or systems that provide services for the end-users. As one example, a human resource system may be configured to use the data generated by the analysis circuit 112 to facilitate assessment of work performance of the end-users.

In some implementations, the analysis circuit is configured to provide alerts to an authorized user in response to data metrics satisfying a set of alert criteria specified by the user. The alert criteria may be specified as a function of various data metrics generated by the call data processing circuit 110. Alert messages may be provided using a number of different types of messages. For instance, in some implementations the analysis circuit 212 is configured to provide an SMS text message notification to one or more telephone numbers indicated in the alert policy in response to the alert criteria being satisfied. In some implementations, the analysis circuit 212 is configured to send an automated voice call to the telephone number(s). In some embodiments, the analysis circuit 212 is configured to send an email notification to an email address indicated in the alert policy. In some embodiments, alert messages are provided using other messaging services (e.g., Facebook, MySpace, Twitter, and/or Instant Messengers). In some implementations, multiple notifications are sent to multiple recipients and/or use multiple types of messages.

In some implementations, the processing circuit may be further configured to perform a set of actions listed in the alert policy, in response to the alert criteria being satisfied. In some implementations, an authorized user may be prompted to select an appropriate action to be taken. In some implementations, the alert message that is sent to an authorized user is configured to provide a mechanism for the user to select from one or more possible actions. For instance, in one implementation, an email or SMS text message may include a web address link to a webpage from which a user may select an action to take. In another implementation, a user may select a desired action by responding to an SMS text message with a text message indicating the selected action. The settings of an alert policy (e.g., alert criteria for trigging alert messages, message options, users to alert, and/or additional actions to take in response to the criteria being satisfied) may be adjusted by an authorized user, for example, via a graphical user interface (GUI).

Figure 2:
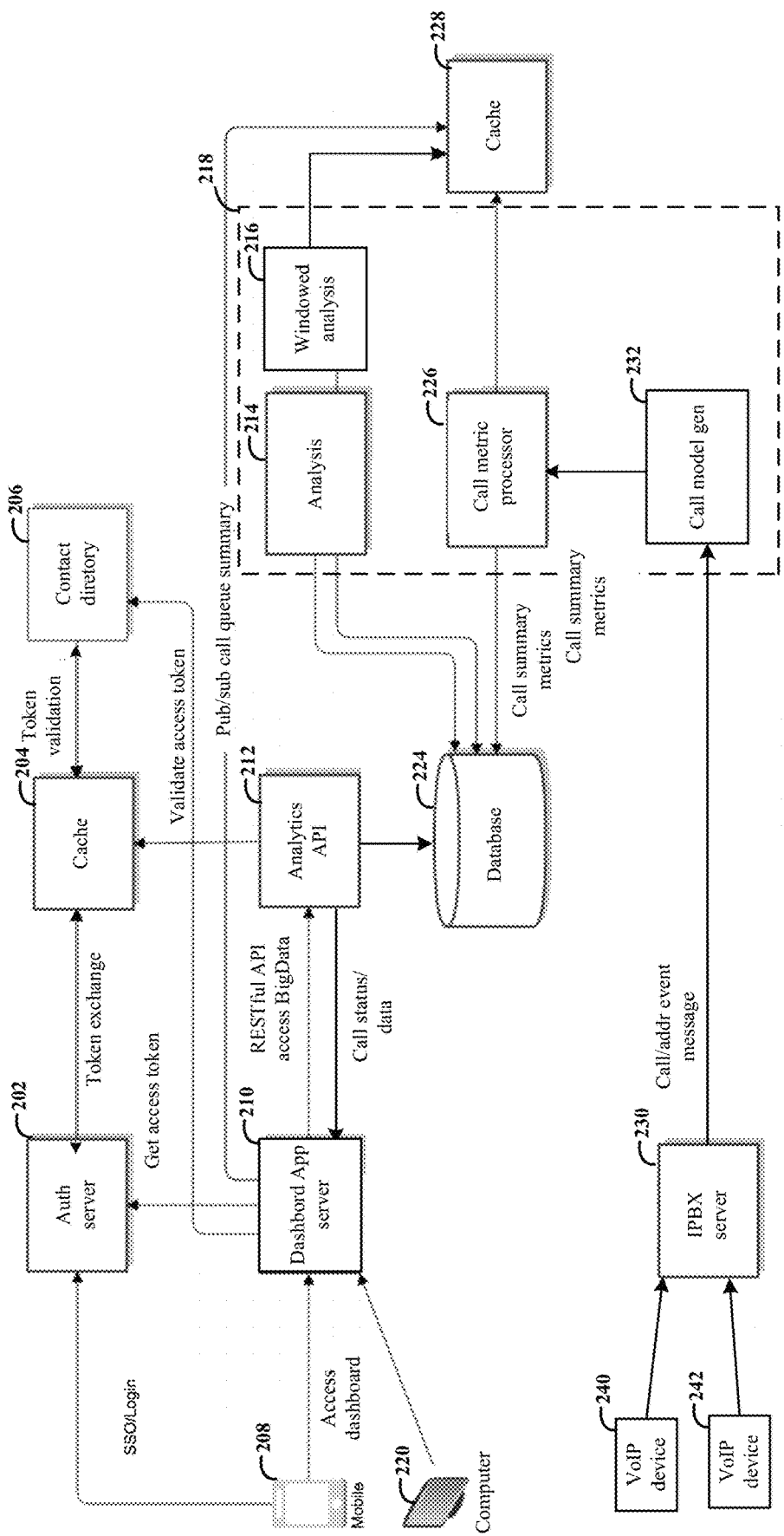
FIG. 2 shows a second example communication system having an IPBX and call data processing circuit configured in accordance with one or more embodiments.

FIG. 2 shows a second example communication system having an IPBX server configured in accordance with one or more embodiments. The system includes an IPBX server 230 and a call data processing circuit 218 configured to operate, for example, as described with reference to an IPBX server 120 and call data processing circuit 110 in FIG. 1. The IPBX server 230 is configured to route calls to and from VoIP devices 240 and 242 for a plurality of end-users having respective extensions.

In this example, the call data processing circuit 218 includes a call model generation circuit 232 configured to receive call event messages from the IPBX server 230. The call event messages may be communicated, for example, as computer-telephony-integration (CTI) messages. The call model generation circuit 232 generates call models based on the call event messages. Call metric processor 226 generates call summary metrics from the generated call models.

In this example, the call metric processor 226 is configured to store the generated call summary metrics in a database 224. The database 224 is configured to retain the call summary metrics until deleted by an authorized user. In this example, the call metric processor 226 is also configured to store the call summary metric for a limited window of time in a cache circuit 228. In some implementations, the call summary metrics in the cache circuit 228 may be updated as the call summary metrics are generated or expired. In some other implementations, call summary metrics may be updated at the beginning of each time window. In this example, the call data processing circuit 218 includes a first analysis circuit 214 configured to perform analysis on call metric data stored in the data base. The call data processing circuit 218 also includes a second analysis circuit 216 configured to perform analysis on the windowed call metric data stored in the cache circuit 228. Analytics data generated by the analysis circuits 214 and 216 may be stored in the database 224 for access by various applications.

The system includes one or more dashboard application servers 210, which may provide various applications to end-users devices 208 and 220 which utilize the call summary metric data stored in the database 224. As one example, the dashboard application servers 210 may provide a manager application to facilitate assessment of performance/efficiency of end-users in a call center, based on analysis of the call summary metrics stored in the database 224. As another example, the dashboard application servers 210 may provide a switchboard interface (not shown) for a receptionist to direct the routing of calls by the IPBX server 230. The dashboard application servers 210 relay call control commands and call events between the switchboard interface and the IPBX server 230. In some implementations, a switchboard interface may display statuses of end-users in a contact directory 206 for the IPBX in a graphically user interface. The statues of end-users may be determined based on an analysis of call summary metrics and/or other data stored in the database 224. An end-user may access the example switchboard interface or manager applications, by directing a web-browser on a computing device (e.g., end-users devices 208 or 220) to a corresponding web server provided by the dashboard application servers 210.

The system may include various servers and circuits that provide various support services. For example, the system may include an application process interface circuit 212 configured to retrieve analytics and/or call summary metrics from the database on behalf of applications provided by the dashboard application servers 210. As another example, the system may include an authentication server 202 configured to authenticate users and permissions for various servers or applications in the system. For instance, when an end-user device 208 or 220 logs into an application provided by the dashboard application server 210, the dashboard application server 210 may authenticate the end-user using the authentication server 202. In some implementations, the authentication server may retrieve an authentication token and/or other user data from contact directory 206 as part of the login process. In some implementations, the token or data may be temporarily cached in a cache circuit 204.

Figure 3:
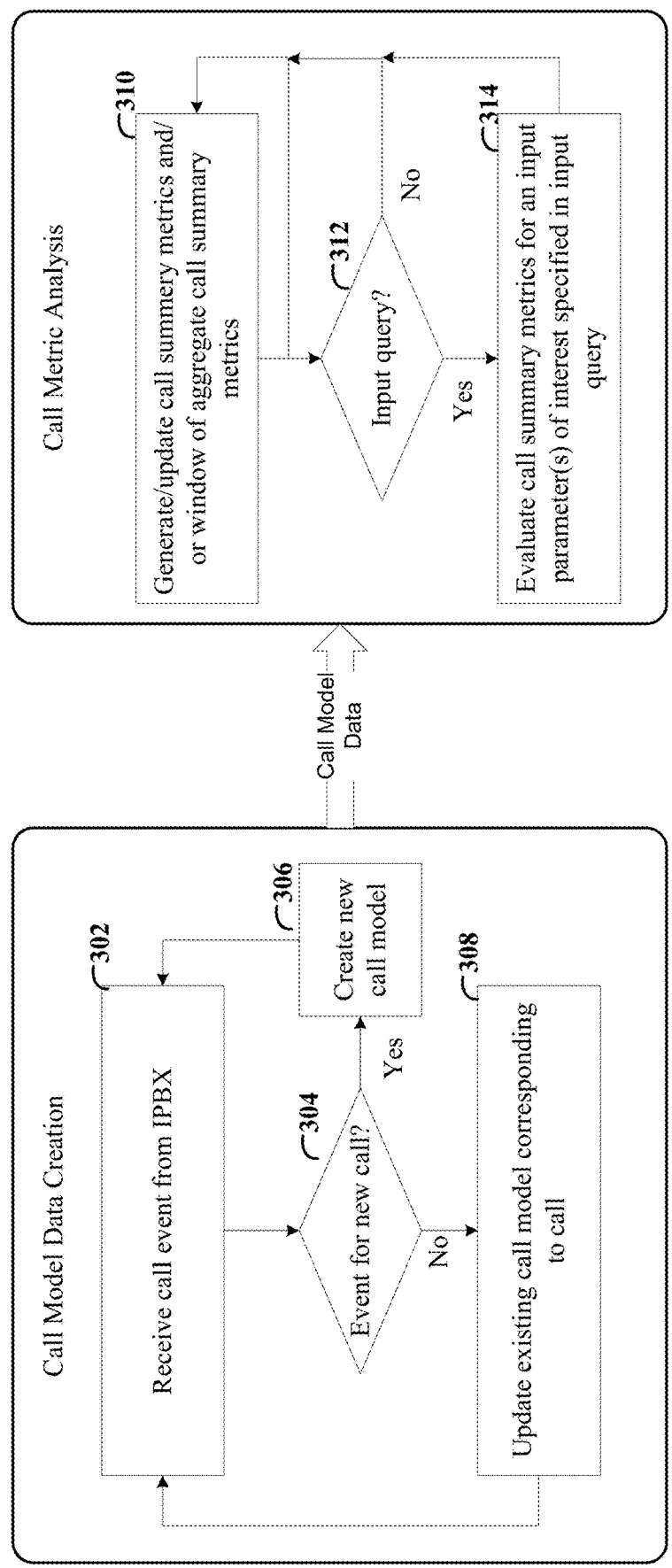
FIG. 3 shows an example process for generating call models and call summary metrics from call event data produced by an IPBX, consistent with one or more embodiments.

FIG. 3 shows an example process for generating call models and call summary metrics from call event data produced by an IPBX server, consistent with one or more embodiments. At block 302, a call event is received from the IPBX server. If the call event indicates the initiation of a new call, decision block 304 directs the process to create a new call model at block 306 and the process waits for another call event to be received at block 302. Otherwise, if the call event corresponds to an existing call, the existing call model corresponding to the call is updated at block 308.

In a separate process, call summary metrics may be generated and/or updated at block 310 based on the call models. Additionally or alternatively, the process may update aggregate call summary metrics for a designated time window. As previously indicated, the time window for aggregation of call summary metrics may be, for example, minutes, hours, days, weeks, or years. In some implementations, one or more call summary metrics may be updated in real time at block 310, for example, as respective links between two call participants which are detected or terminated during a call. Additionally or alternatively, one or more call summary metrics may be updated after a call has ended and the corresponding call model is completed. In some implementations, the call summary metrics may be generated or updated for each call individually. In some other implementations, call summary metrics may be generated or updated for a plurality of calls as part of a batch process. In response to a user query, decision process 312 directs the process to block 314. At block 314, the call summary metrics are evaluated for an input parameter of interest, as previously described.

Figure 4:
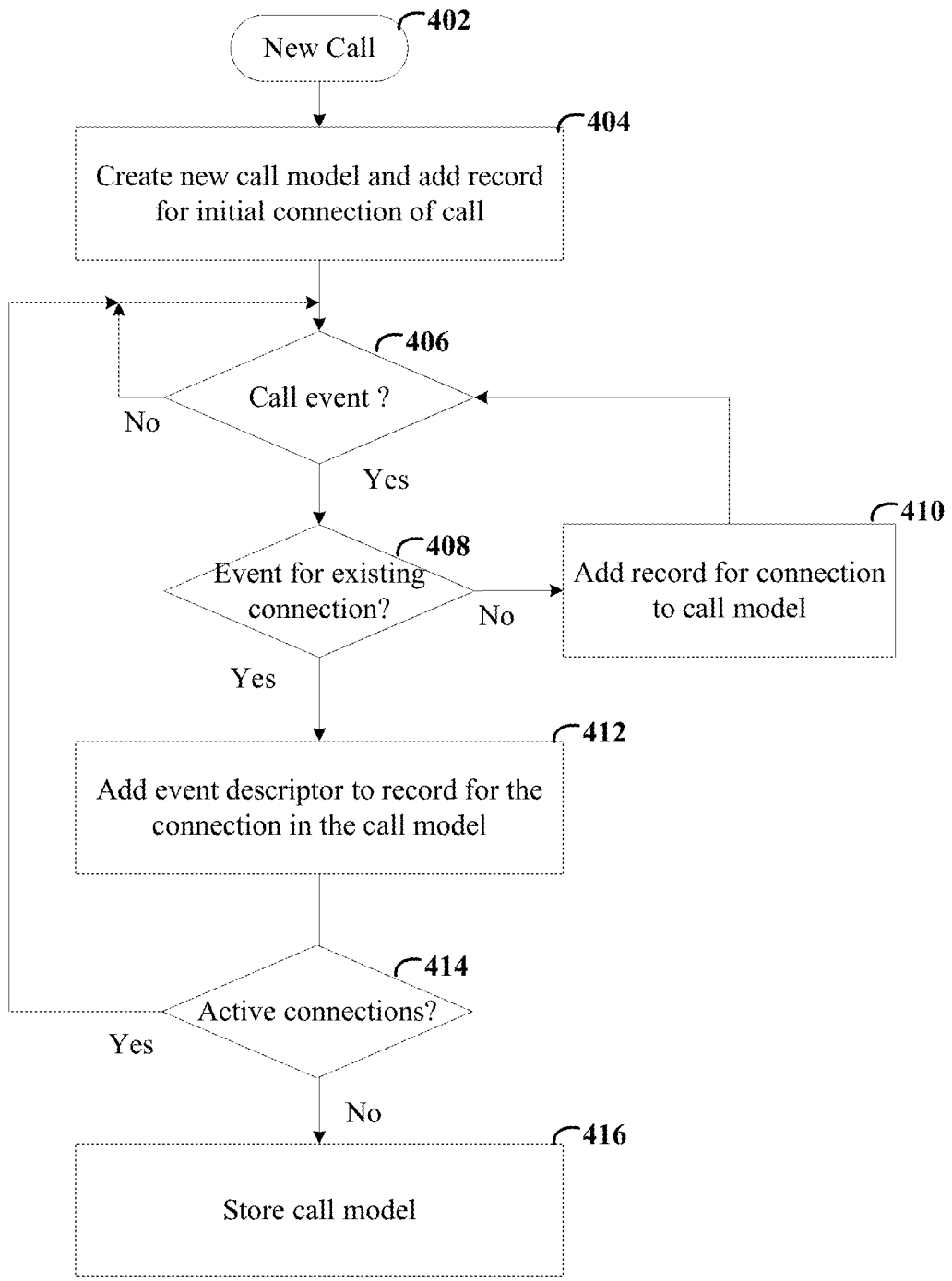
FIG. 4 shows an example process for generating call models, consistent with one or more embodiments.

FIG. 4 shows an example process for generating a call model, consistent with one or more embodiments. The process is initiated in response to a new call 402. At block 404, a new call model is created and a record is added for an initial link between two end-user participants of the call. The link between two end-user participants can include multiple link segments such as between the end-users a back-to-back user agents (B2BUA). A B2BUA can provide additional functionality, assist with network address translation (NAT) traversal, or both. The process waits at decision block 406 until a call event for the call is received. If a received call event is not for an existing link between participants of the call, decision block 408 directs the process to add a new record for the new link to the call model at block 410. Otherwise, if the received call event corresponds to an existing link between end-user participants of the call, an event descriptor is added to the record for the link in the call model at block 412. If there are active links between end-user participants for the call, decision block 414 directs the process back to waiting for another call event for the call at decision block 406. The process repeats in the manner until all links between end-user participants of a call are terminated at block 414. If all links between end-user participants have been terminated, the call model is stored at block 416.

The example process shown in FIG. 4 is configured to generate a call model having a format that includes a respective record for each telecommunications link between end-user participants of a call, where the record indicates various data relating to the telecommunications link. The process may be adapted to generate call models utilizing other formats and/or specifying different data relating to the call. For example, rather than organizing data into respective records for each link, the process may be adapted to include a respective record for each participant of a call.

Figures 1, 5:
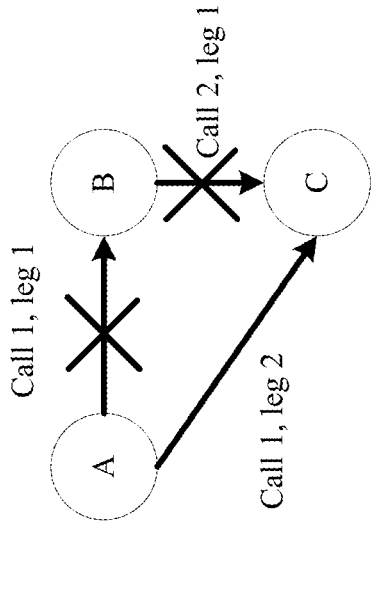
Figures 2, 5:
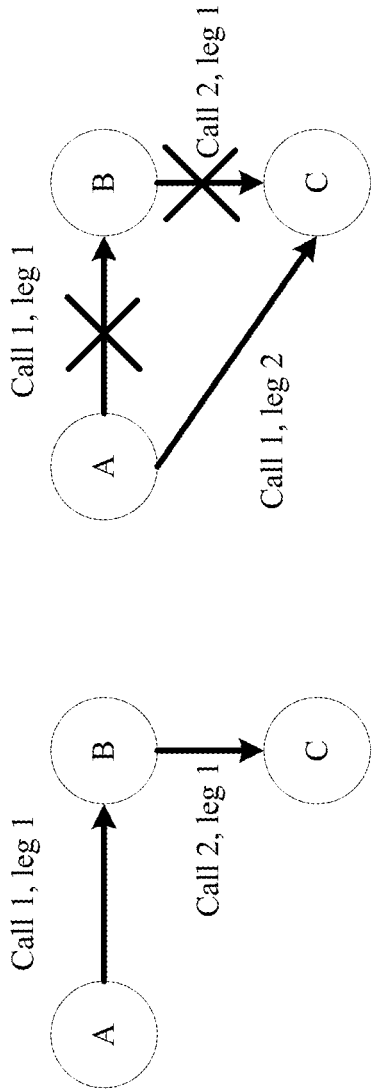
Figures 3, 5:
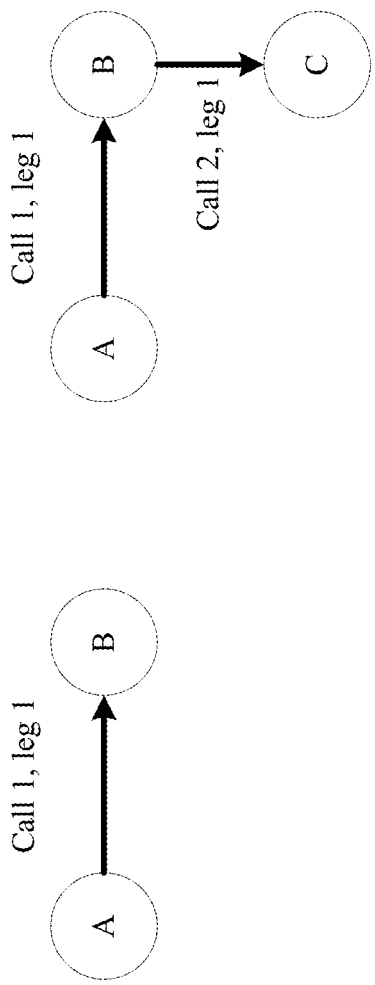
Figures 4, 5:
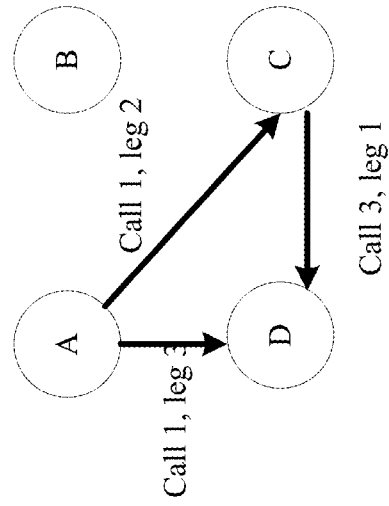
Figure 5:
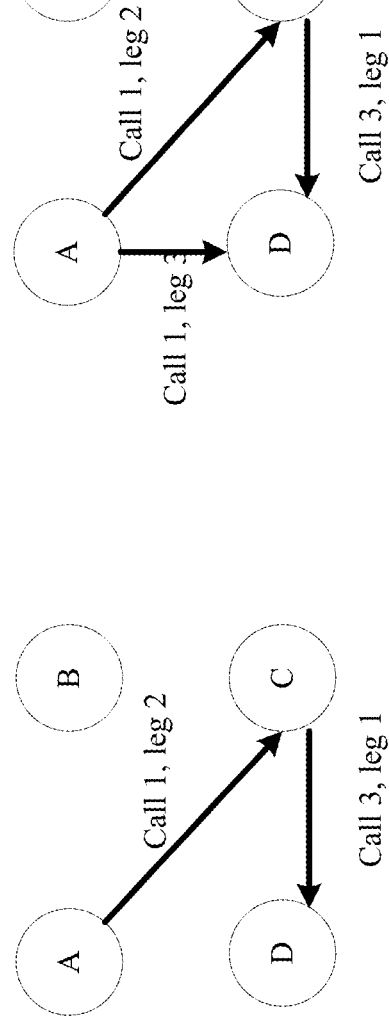

FIGS. 5-1 through 5-5 illustrate an example call having telecommunication links between multiple call participants. Examples 1 through 6 below show an example call model generated using the process shown in FIG. 4 for the call illustrated in FIGS. 5-1 through 5-5. FIG. 5-1 shows a first end-to-end link being established between end-user A to end-user B for a first call. As previously indicated with reference to FIG. 4, a link between end-users may include multiple link segments. For ease of reference, a telecommunications link between two user end-user participants of a call may be referred to as a leg of the call. A new call model is created in response to a first leg between two end-user participants being initiated for the call. Example 1 shows an example call record created in response to the call being initiated. Record 1 is added to the call model for the first leg of the first call. The record indicates a unique identifier for the call (e.g., Call 1) and a leg identifier for the first leg of the call (e.g., Leg 1). In some implementations, records may also specify the relationship of the call to other calls. For example, the record may also specify a call identifier of a parent call (if applicable). For instance, if a parent call is forked into two child calls, records for each of the child calls may include the call identifier of the parent call. Similarly, if a call leg of a first call is transferred to or merged with a second call, a call identifier for the second call may be added to the record for the call leg to record the transfer. An example call transfer is discussed in more detail with reference to example 3.

Referring again to example 1, the record indicates addresses of end-users (e.g., addrA and addrB) connected by the first leg of the call. As call events for the leg of the call are received, descriptors are added to the record. In the example call model shown in Example 1, a first descriptor ($T_{Ring}$) is added to log a time at which a call ($T_{connect}$) event is generated to alert end-user B of the incoming call from end-user A. When end-user B answers the call, a second call event is generated by the IPBX server and a new event descriptor ($T_{connect}$) is added to Record 1. In response to the second call event, a second descriptor is also added to record a time at which a call event is generated to indicate that the call leg is established.

Example 1

Record 1=Call 1, Leg 1, addrA, addrB, $T_{Ring}$, $T_{Connect}$

FIGS. 5-2 and 5-3 show a two-step process for transferring the call from end-user B to end-user C. In FIG. 5-2, a link is initiated between end-user B and end-user C as a first leg of a second call. In response, Record 2 is added to the call model with descriptors $T_{ring}$ and $T_{connect}$ as shown in Example 2.

Example 2

Record 1=Call 1, Leg 1, addrA, addrB, $T_{Ring}$, $T_{Connect}$,
Record 2=Call 2, Leg 1, addrB, addrC, $T_{Ring}$, $T_{Connect}$ In FIG. 5-3, the call legs of the first and second calls are merged to become a second leg of the first call. Call events are generated by the IPBX server to indicate that second leg of the first call is connected and that the legs of the call between end-users A and B and between end-users B and C are disconnected. In response to the call events, descriptors are added to the records as shown in Example 3. A descriptor (Txfr→Call 1) is added to log that the leg was transferred to call 1. A descriptor ($T_{disconnect}$) is added to Records 1 and 2 to indicate a time that the legs were disconnected. A descriptor ($T_{connect}$) is also added to log a time that the leg between end-users A and C is initiated.

Example 3

Record 1=Call 1, leg 1, addrA, addrB, $T_{Ring}$, $T_{Connect}$, $T_{Disconnect}$,
Record 2=Call 2, leg 1, addrB, addrC, $T_{Ring}$, $T_{Connect}$, Txfr→Call 1, $T_{Disconnect}$,
Record 3=Call 1, leg 2, addrA, addrC, $T_{Connect}$, FIGS. 5-4 and 5-5 show an example two-step process of adding a third end-user D to a conference with end-users A and C. In FIG. 5-4, a first leg for a third call is initiated from end-user C to D. For instance, end-user C may put end-user A on hold and initiate a new call to end-user D. As shown in Example 4, Record 4 is added to the call model for the new leg of the new call. As previously described $T_{Ring}$, $T_{Connect}$ are added to Record 4 to indicate the time that user D was alerted and when user D answered the call. A descriptor ($T_{Hold}$) is also added to Record 3 to log a time that end-user A was put on hold.

Example 4

Record 1=Call 1, leg 1, addrA, addrB, $T_{Ring}$, $T_{Connect}$, $T_{Disconnect}$,
Record 2=Call 2, leg 1, addrB, addrC, $T_{Ring}$, $T_{Connect}$, Txfr→Call 1, $T_{Disconnect}$,
Record 3=Call 1, leg 2, addrA, addrC, $T_{Connect}$, $T_{Hold}$
Record 4=Call 3, leg 1, addrC, addrD, $T_{Ring}$, $T_{Connect}$, In FIG. 5-5, a third leg between end-users A and D is initiated for the first call in response to end-user C selecting to merge the calls. After which, end-user A is taken off hold. As shown in Example 5, Record 5 is added to the call model for the new leg. Descriptor $T_{connect}$ is added to indicate the time that the leg was established. A descriptor (Conf→call 1) is added to log that Call 3 was merged with call 1 in conference. A descriptor ($T_{Reconnect}$) is also added to Record 3 to log the time that end-user A was taken off-hold.

Example 5

Record 1=Call 1, leg 1, addrA, addrB, $T_{Ring}$, $T_{Connect}$, $T_{Disconnect}$,
Record 2=Call 2, leg 1, addrB, addrC, $T_{Ring}$, $T_{Connect}$, Txfr→Call 1, $T_{Disconnect}$,
Record 3=Call 1, leg 2, addrA, addrC, $T_{Connect}$, $T_{Hold}$, $T_{Reconnect}$,
Record 4=Call 3, leg 1, addrC, addrD, $T_{Ring}$, $T_{Connect}$, Conf→Call 1,
Record 5=Call 1, leg 3, addrA, addrD, $T_{connect}$, The legs are terminated in response to users A, C, and D hanging up. As legs are terminated, $T_{Disconnect}$ descriptors are added to records 3, 4, and 5. The final call model is shown in Example 6.

Example 6

Record 1=Call 1, leg 1, addrA, addrB, $T_{Ring}$, $T_{Connect}$, $T_{Disconnect}$,
Record 2=Call 2, leg 1, addrB, addrC, $T_{Ring}$, $T_{Connect}$, Txfr→Call 1, $T_{Disconnect}$,
Record 3=Call 1, leg 2, addrA, addrC, $T_{Connect}$, $T_{Hold}$, $T_{Reconnect}$, $T_{Disconnect}$,
Record 4=Call 3, leg 1, addrC, addrD, $T_{Ring}$, $T_{Connect}$, Conf→Call 1, $T_{Disconnect}$, Record 5=Call 1, leg 3, addrA, addrD, $T_{Connect}$, $T_{Disconnect}$, FIGS. 6-1 through 6-3 illustrate another example call having telecommunication links between multiple call participants. Examples 7 through 10 below show an example call model generated using the process shown in FIG. 4 for the call illustrated in FIGS. 6-1 through 6-3. FIG. 6-1 shows a first end-to-end link being established between end-user A to ring group B for a first call.

A new call model is created in response to the first leg being initiated for the call. Example 7 shows an example call record created in response to the call being initiated. Record 1 is added to the call model for the first leg of the first call. The record indicates a unique identifier for the call (e.g., Call 1) and a leg identifier for the first leg of the call (e.g., Leg 1).

Example 7

Record 1=Call 1, Leg 1, addrA, addrB, $T_{Ring}$, $T_{Connect}$

In response to the call to ring group B, the call is forked to end-users C and D, which are included in the ring group. FIGS. 6-2 and 6-3 show a two-step process for forking the call to end-users C and D. In FIG. 6-2, a link is initiated between ring-group B and end-user C as a first leg of a second call. In response, record 2 is added to the call model as shown in Example 8. A link is also initiated between ring group B and end-user D as a first leg of a third call. In response, record 3 is added to the call model as shown in Example 8. In addition to address descriptors for the call legs, records 2 and 3 also include descriptors identifying call 1 as a parent call.

Example 8

Record 1=Call 1, Leg 1, addrA, addrB, $T_{Ring}$, $T_{Connect}$,
Record 2=Call 2, Leg 1, addrB, addrC, parent: call 1, $T_{Ring}$
Record 3=Call 3, Leg 1, addrB, addrD, parent: call 1, $T_{Ring}$ In this example, the forked call is answered by end-user C. In FIG. 5-3, the leg of the third call is stopped and legs of the first and second calls are merged to become a second leg of the first call. The first call legs of the first and second calls are then disconnected. Record 3 is updated to add a descriptor indicating a time that the call leg was stopped ($T_{stop}$) as shown in Example 9. Record 2 is updated to add a descriptor indicating a time that the call was answered ($T_{connect}$) and to record the transfer of the call leg to the first call. Records 1 and 2 are also updated to include descriptors indicating times at which the call legs were disconnected following transfer of the first leg of the second call.

Example 9

Record 1=Call 1, Leg 1, addrA, addrB, $T_{Ring}$, $T_{Connect}$, $T_{Disconnect}$
Record 2=Call 2, Leg 1, addrB, addrC, parent: call 1, $T_{Ring}$, $T_{Connect}$
  Txfer→Call 1
Record 3=Call 3, Leg 1, addrB, addrD, parent: call 1, $T_{Ring}$, $T_{stop}$
Record 4=Call 1, leg 2, addrA, addrC, $T_{Connect}$ The second leg of the first call is terminated in response to either of end-users A or C hanging up. In response to the leg being terminated, a descriptor ($T_{Disconnect}$) is added to record 4. The final call model is shown in Example 10.

Example 10

Figure 7:
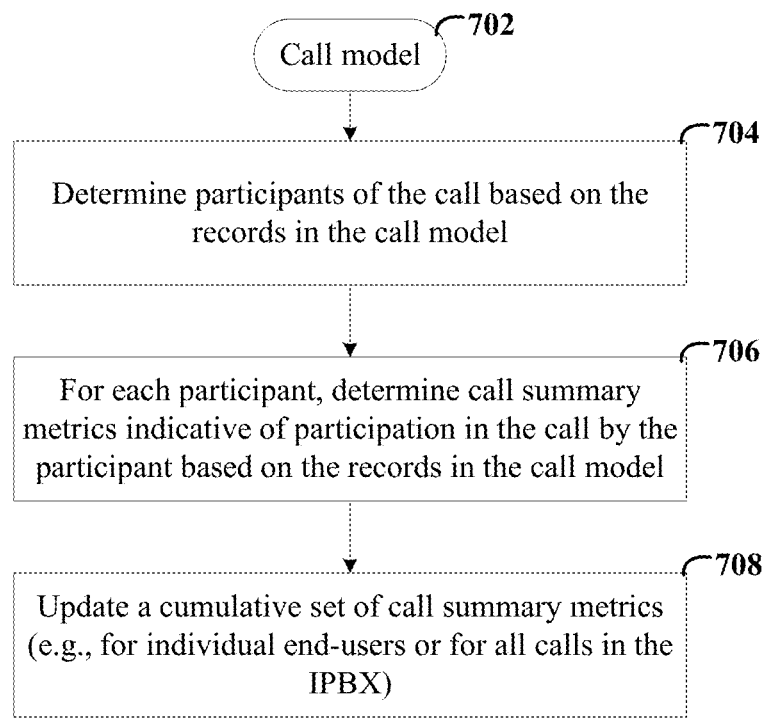
FIG. 7 shows an example process for generating call summary metrics from a call model, consistent with one or more embodiments.

Record 1=Call 1, Leg 1, addrA, addrB, $T_{Ring}$, $T_{Connect}$, $T_{Disconnect}$
Record 2=Call 2, Leg 1, addrB, addrC, parent: call 1, $T_{Ring}$, $T_{Connect}$,
  Txfer→Call 1
Record 3=Call 3, Leg 1, addrB, addrD, parent: call 1, $T_{Ring}$, $T_{stop}$
Record 4=Call 1, leg 2, addrA, addrC, $T_{Connect}$, $T_{Disconnect}$ As previously described with reference to FIG. 3, call summary metrics can be determined from the records in the call model. Call summary metrics may be determined from the call models using various processes. FIG. 7 shows one example process for generating call summary metrics from a call model, consistent with one or more embodiments. In response to the generation of a call model 702, participants of the call are determined at block 704 based on records in the call model. For each end-user determined to be a participant, respective call summary metrics are determined at block 706. The call summary metrics are indicative of participation in the call by the end-user. Call summary metrics indicative of end-user participation may include, for example, a total time the end-user was on the call, time the end-user had the call on hold, time for the end-user to answer the call, whether or not the end-user transferred the call, whether the call was abandoned, and/or performance outcome (e.g., sales results or customer survey ratings). At block 708, the call summary metrics determined at block 706 for the end-user are used to update cumulative call summary metrics. In some implementations, the cumulative call summary metrics may include call summary metrics individually aggregated for each user for multiple calls. Alternatively or additionally, the cumulative call summary metrics may include summary metrics individually aggregated for calls of all or groups of end users.

In the example process shown in FIG. 7, the determined call summary metrics are indicated participation of end-users in the call. Alternatively or additionally, the process may determine call summary metrics indicating various statistics of the call that are non-user specific. For instance, the call summary metrics may indicate a total call time, total on hold time, number of transfers, number of call participants, etc. Furthermore, the process shown in FIG. 7 determines call metrics from a call model having a format that includes a respective record for each leg of the call. Alternatively, the process shown in FIG. 7 may be adapted to determine call metrics from call models having other formats (e.g., having respective records for each call participant or respective records for each call event).

Figure 8:
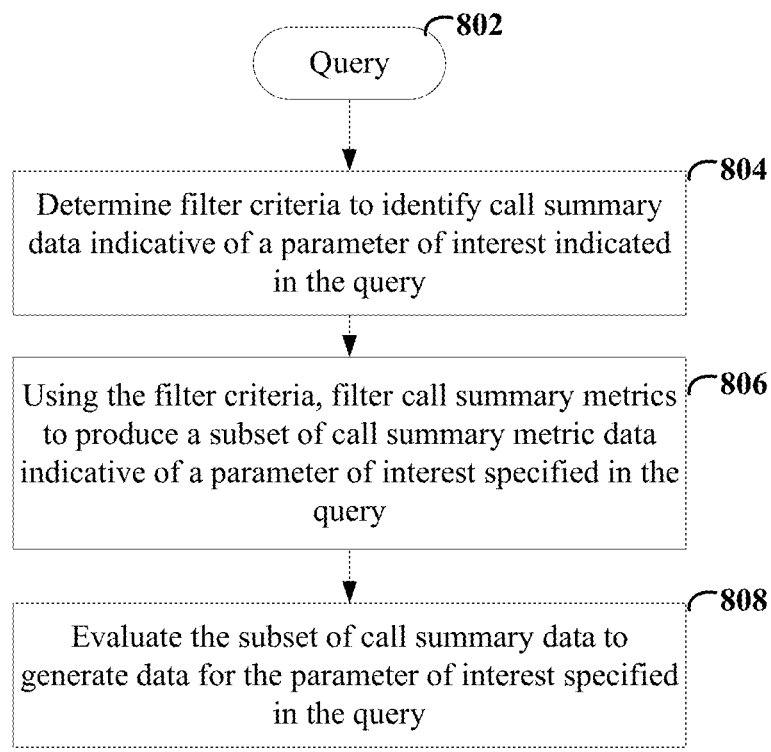
FIG. 8 shows an example process for analyzing a parameter of interest using determined call summary metrics, consistent with one or more embodiments.

In some embodiments, the call data processing circuit may perform various analytical processes to analyze call summary metrics. FIG. 8 shows an example process for analyzing a parameter of interest using determined call summary metrics, consistent with one or more embodiments. At block 804, filter criteria is determined to identify call summary data indicative of a parameter of interest indicated in an input query 802. At block 806, the filter criteria is used to filter call summary metrics to produce a subset of call summary metric data that is indicative of a parameter of interest specified in the query 802. At block 808, the subset of call summary data is evaluated to generate data for the parameter of interest specified in the query.

The input query may request data on various parameters of interest. As an example parameter of interest, an input query may request call summary metrics indicative of end-user performance or efficiency in answering incoming calls. Referring to the previously described example, call summary metrics for calls to an end-user may only be indicative of performance or efficiency for times in which the end-user is at their desk and not engaged in higher-priority tasks. In some implementations, determined filter criteria may use presence (or activity) data, correlated with call summary metrics, to identify call summary metrics generated from calls in which the end-user is present at their desk. Using the filter criteria, a relevant subset of the call summary metrics may be determined and used to generate data requested by the input query.

As another example parameter of interest, the input query may request to identify a set of values of the call summary metrics, which have a strong correlation to a set of calls specified by the input query. After identifying the set of values, the values may be used as a signature to identify similar calls as they occur. This process may be useful, for example, to determine a signature to detect fraudulent calls based on calls previously identified as being fraudulent. Similarly, the input query may specify call summary metrics and/or analytics for customers leading up to new sales contracts.

As yet another example parameter of interest, the input query may request to identify call summary metrics that are exhibiting a recent trend in comparison to a historical average value. Trends may be identified, for instance, based on deviation of metric values in a recent time window from an average calculated from the previous time window. In some implementations, the analysis process may further evaluate identified trends to identify other metrics that exhibit a strong correlation with the identified trend.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in FIGS. 1 and 2. Similarly, it will be apparent that a server (e.g., providing a corresponding software platform), includes a computer processing circuit that is configured to provide services to other circuit-based devices. Moreover, a VoIP-enabled circuit device includes processing circuits that are configured to establish VoIP communication sessions with other devices (e.g., personal computers, IP-enabled mobile phones, and tablet computers). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a Central Processing Unit (CPU) hardware-based circuit and a set of instructions in the form of firmware, in which the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus, comprising:
   an internet-protocol private branch exchange (IPBX) server configured and arranged to route Voice over Internet Protocol (VoIP) calls for a plurality of end-users having respective VoIP-enabled circuit devices communicatively coupled to the IPBX server via a circuit-based communications network; and
   a call data processing circuit communicatively coupled to the IPBX server and configured and arranged to
      receive from the IPBX server, call event messages indicating a change in status of routed VoIP calls from the IPBX server,
      generate call models from the call event messages indicating the change in the status of routed VoIP calls in which the call models have respective data record for each telecommunications link initiated between two participants of the respective calls, including:
         generating initial call models based on respective ones of the initiated telecommunication links, and
         updating the initial call models over time while the call event messages are received during a duration of the respective calls, by merging additional telecommunication links for the call in the call models;
      generate, from the call models, call summary metrics indicative of statistics of the VoIP calls routed; and
      in response to an input query, evaluate the call summary metrics for a parameter of interest specified in the input query to generate data for the parameter of interest.

2. The apparatus of claim 1, wherein the call models are updated in real time and during the duration of the respective call based on one or more of the respective links being initiated or terminated during the call, the data records of call models include identifiers of the call, identifier of a leg of the call, addresses of the two participants, and a status of the respective telecommunication link, wherein the call data processing circuit is configured and arranged to, in the generating of one of the call models:
   create a call model in response to a first call event message indicating a new call;
   add a first data record to the created call model for a first telecommunications link between two participants of the call, indicated by the first call event message; and
   in response to a second call event message indicating initiation of a second telecommunications link for the call indicated by the first call event message, add a second data record to the created call model.

3. The apparatus of claim 2, wherein the status of the respective telecommunication link includes an indication of call terminated, call connected, and/or call transferred, and wherein each record in the call model indicates respective VoIP addresses for two participants served by the telecommunications link corresponding to the call record, and includes data indicative of call participants and events of a respective call routed by the IPBX.

4. The apparatus of claim 3, wherein the data records of call models further includes time stamps indicative of the call being placed, the call being connected, and/or the call terminating, and wherein the call data processing circuit is further configured and arranged to, in the generating of the one of the call models in response to a call event message indicating an event for an existing telecommunications link of a the call, add a descriptor for the call event message to a record for the existing telecommunications link in the created call model.

5. The apparatus of claim 4, wherein, the descriptor specifies a time at which the call event message was received.

6. The apparatus of claim 2, wherein the call data processing circuit is further configured and arranged to, in response to all telecommunications links for a call being disconnected, store a call model generated for the call in a database.

7. The apparatus of claim 2, wherein
the generated call model for the call includes a respective record for each telecommunications link initiated between two participants of the call;
each record in the call model includes identifiers of the two participants connected by the corresponding telecommunications link and includes a plurality of descriptors of call events relating to the corresponding telecommunications link; and
the call data processing circuit is configured and arranged to, as part of the generating of the call summary metrics,
determine participants of a call based upon records in the call model, and
for each of the determined participants, determine a respective set of call summary metrics indicative of participation in the call by the participant.

8. The apparatus of claim 7, wherein the call data processing circuit is configured and arranged to update a cumulative set of call summary metrics based on the respective set of call summary metrics and update the call models in response to at least one of an initiation of a new link, a terminated link, and termination of all links for a respective call.

9. The apparatus of claim 8, wherein the cumulative set of call summary metrics indicates, for each of the plurality of end-users, at least one call summary metric indicative of participation by the end-user in a plurality of calls routed by the IPBX server.

10. The apparatus of claim 8, wherein the cumulative set of call summary metrics indicates, for calls to or from the plurality of end-users, a number incoming calls, a number of outgoing calls, a number of answered calls, a number of missed calls, a number of abandoned calls, average call time, average time to answer, average on-hold time, or combinations thereof.

11. The apparatus of claim 1, wherein the call data processing circuit is configured and arranged to evaluate the call summary metrics for the parameter of interest by performing operations including generating filter parameters for the generated call summary metrics;
filtering the call summary metrics based upon the filter parameters to produce a subset of the call summary metrics; and
generating data for the parameter of interest based on the subset of the call summary metrics.

12. The apparatus of claim 11, wherein the generating of filter parameters for the generated call summary metrics includes, for each of the call summary metrics:
determining a strength of correlation between the call summary metric and the parameter of interest, wherein the parameter of interest is selected from a group of parameters consisting of: identifiers for specific ones of the call summary metrics, criteria for identifying subsets of the call summary metrics, values derived from a function of the call summary metrics, and a combination thereof; and
configuring filter parameters to filter out ones of the call summary metrics having a determined strength of correlation that is less than a threshold strength.

13. The apparatus of claim 1, wherein the call data processing circuit is configured and arranged to, in response to the input query, generate a signature for identification of calls having the parameter of interest, based on the generated call summary metrics, wherein the parameter of interest is selected from a group of parameters consisting of: identifiers for specific ones of the call summary metrics, criteria for identifying subsets of the call summary metrics, values derived from a function of the call summary metrics, and a combination thereof.

14. The apparatus of claim 1, wherein the statistics of the VoIP calls routed by the IPBX server include statistics that correspond to outgoing VoIP calls routed by the IPBX server.

15. The apparatus of claim 1, wherein the statistics of the VoIP calls routed by the IPBX server include statistics that correspond to both ingoing and outgoing VoIP calls routed by the IPBX server, and wherein the call data processing circuit includes circuitry to generate the call models based on the call event messages received from the IPBX server, and, in response, to further generate data metrics indicating statuses associated with the respective VoIP-enabled circuit devices, wherein the statuses indicate one or more of the following for one of the respective VoIP-enabled circuit devices: extensions, call queues, and agent groups in the IPBX.

16. The apparatus of claim 1, wherein the IPBX server is configured to route calls to and from the VoIP-enabled circuit devices.

17. The apparatus of claim 1, wherein the call data processing circuit is further configured to receive from the IPBX server, call event messages indicating a change in status of incoming and outgoing VoIP calls routed from the IPBX server, and wherein the statistics indicated by the call summary metrics include statistics corresponding to the incoming and outgoing VoIP calls.

18. The apparatus of claim 1, wherein the statistics indicated by the call summary metrics include statistics corresponding to the incoming and outgoing VoIP calls, and wherein the input query indicates a request to identify a set of values of the call summary metrics which correlate signatures useful for identifying similar calls as they occur in real time, wherein the signatures include a first signature corresponding to a fraudulent calls and include a second signature corresponding to a customer sales lead.

19. A method, comprising:
using an internet-protocol private branch exchange (IPBX) server,
routing Voice over Internet Protocol (VoIP) calls for a plurality of end-users having respective VoIP-enabled circuit devices communicatively coupled to the IPBX server via a circuit-based communications network, and
providing call event messages, indicating changes in statuses of routed VoIP calls, to a call data processing circuit communicatively coupled to the IPBX server; and
using the call data processing circuit:
generating call models from the call event messages that are indicative of changes in the statuses of routed VoIP calls, the call models including a respective data record for each telecommunications link initiated between two participants of the respective calls, updating the call models over time based on the call event messages being received during the respective calls, by merging additional telecommunication links for the call in the call models, and for the respective calls,
generating call summary metrics from the call models,
correlating the call summary metrics with data indicating presence statuses of the plurality of end-users, and
in response to an input query, evaluating the correlated call summary metrics for a parameter of interest specified in the input query to generate data for the parameter of interest.

20. The method of claim 19, wherein the generating of one of the call models includes
creating a call model in response to a first one of the call event messages indicating a new call;
adding a first data record to the created call model for a first telecommunications link between two participants of the call, indicated by the first call event message; and
in response to a second call event message indicating initiation of a second telecommunications link for the call indicated by the first call event message, adding a second data record to the created call model.

21. The method of claim 20, wherein the generating of the one of the call models further includes, in response to a call event message indicating an event for an existing telecommunications link of the call, adding a descriptor for the call event message to a data record for the existing telecommunications link in the created call model, and using the call data processing circuit, the call models associated with the routed VoIP calls are tracked and updated using the call event messages until each of the termination links for the call are terminated.

22. The method of claim 19, wherein
the generated call model for the call includes a respective record for each telecommunications link initiated between two participants of the call and associated with a different leg of the call;
each record in the call model includes identifiers of the two participants connected by the corresponding telecommunications link and includes a plurality of descriptors of call events relating to the corresponding telecommunications link including an identifier of the call and the respective leg of the call; and
the generating of the call summary metrics includes
determining participants of a call based upon records in the call model, and
for each of the determined participants, determining a respective set of call summary metrics indicative of participation in the call by the participant.

23. The method of claim 22, further comprising updating a cumulative set of call summary metrics based on the respective set of call summary metrics.

24. The method of claim 23, wherein the cumulative set of call summary metrics indicates, for each of the plurality of end-users, at least one call summary metric indicative of participation by the end-user in a plurality of calls routed by the IPBX server.

25. The method of claim 23, wherein the cumulative set of call summary metrics indicates, for calls to or from the plurality of end-users, a number incoming calls, a number of outgoing calls, a number of answered calls, a number of missed calls, a number of abandoned calls, average call time, average time to answer, average on-hold time, or combinations thereof.

26. A method, comprising:
using an internet-protocol private branch exchange (IPBX) server,
routing Voice over Internet Protocol (VoIP) incoming and outgoing calls for a plurality of end-users having respective VoIP-enabled circuit devices communicatively coupled to the IPBX server via a circuit-based communications network through which each of the calls uses one or more telecommunications links, and
providing call event messages in real time, indicating changes in statuses of the routed VoIP incoming and outgoing calls, to a call data processing circuit communicatively coupled to the IPBX server; and
using the call data processing circuit,
generating call models from the call event messages,
updating the call models over time based on the call event messages being received during respective ones of the calls, by merging additional telecommunications links in the call models,
generating call summary metrics from the call models, and
in response to an input query, evaluating the call summary metrics for a parameter of interest specified in the input query to generate data for the parameter of interest.

27. The method of claim 26, wherein the call summary metrics are generated based on data metrics indicating statuses associated with the respective VoIP-enabled circuit devices, wherein the statuses indicate one or more of the following for one of the respective VoIP-enabled circuit devices: extensions, call queues, and agent groups in the IPBX.

* * * * *